March 30, 1948. R. S. HERTZLER 2,438,500
CONVEYING MECHANISM FOR HARVESTING MACHINES
Filed Dec. 11, 1945 2 Sheets-Sheet 2
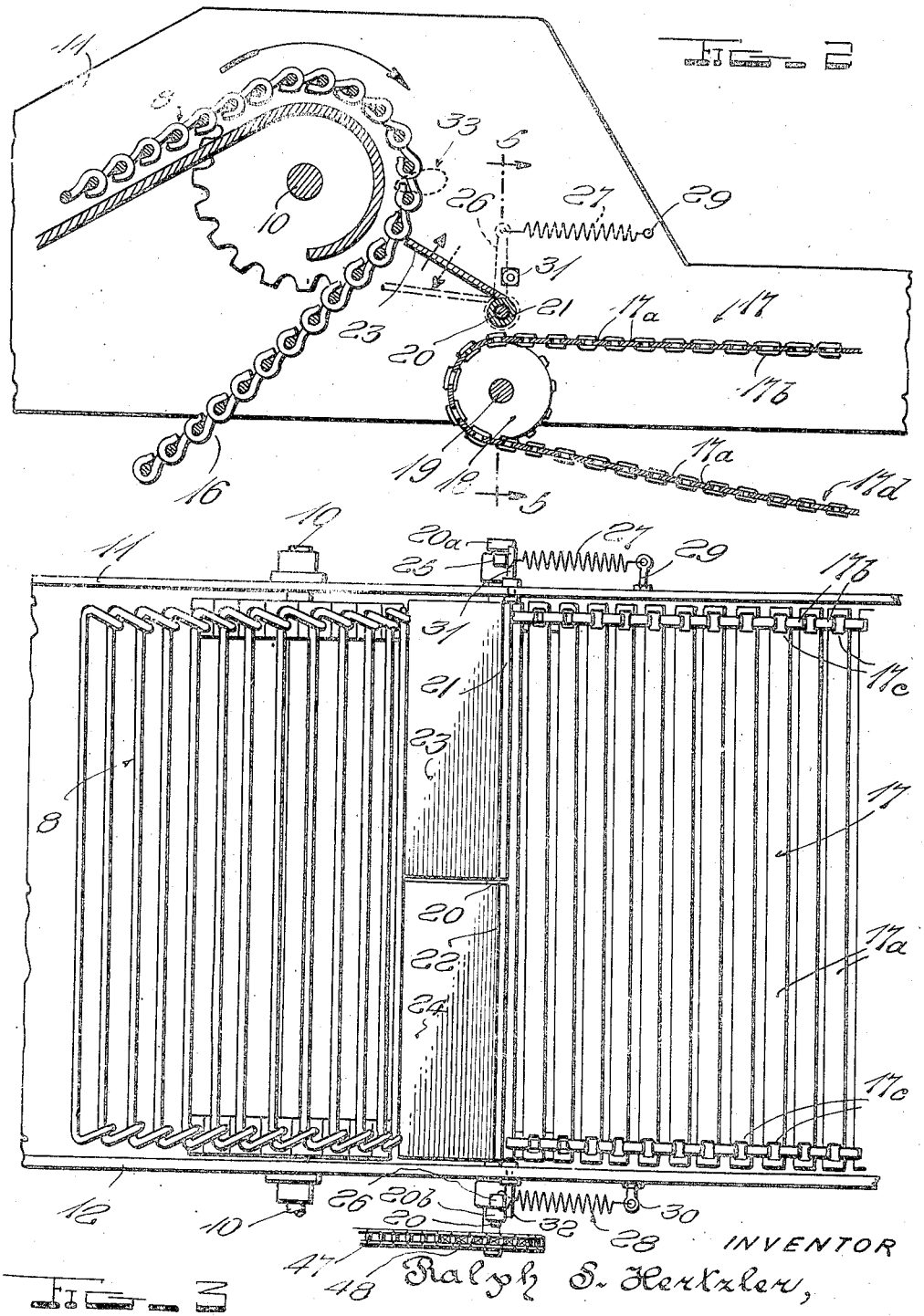
INVENTOR
Ralph S. Hertzler,
By John B. Grady
ATTORNEY Patented Mar. 30, 1948

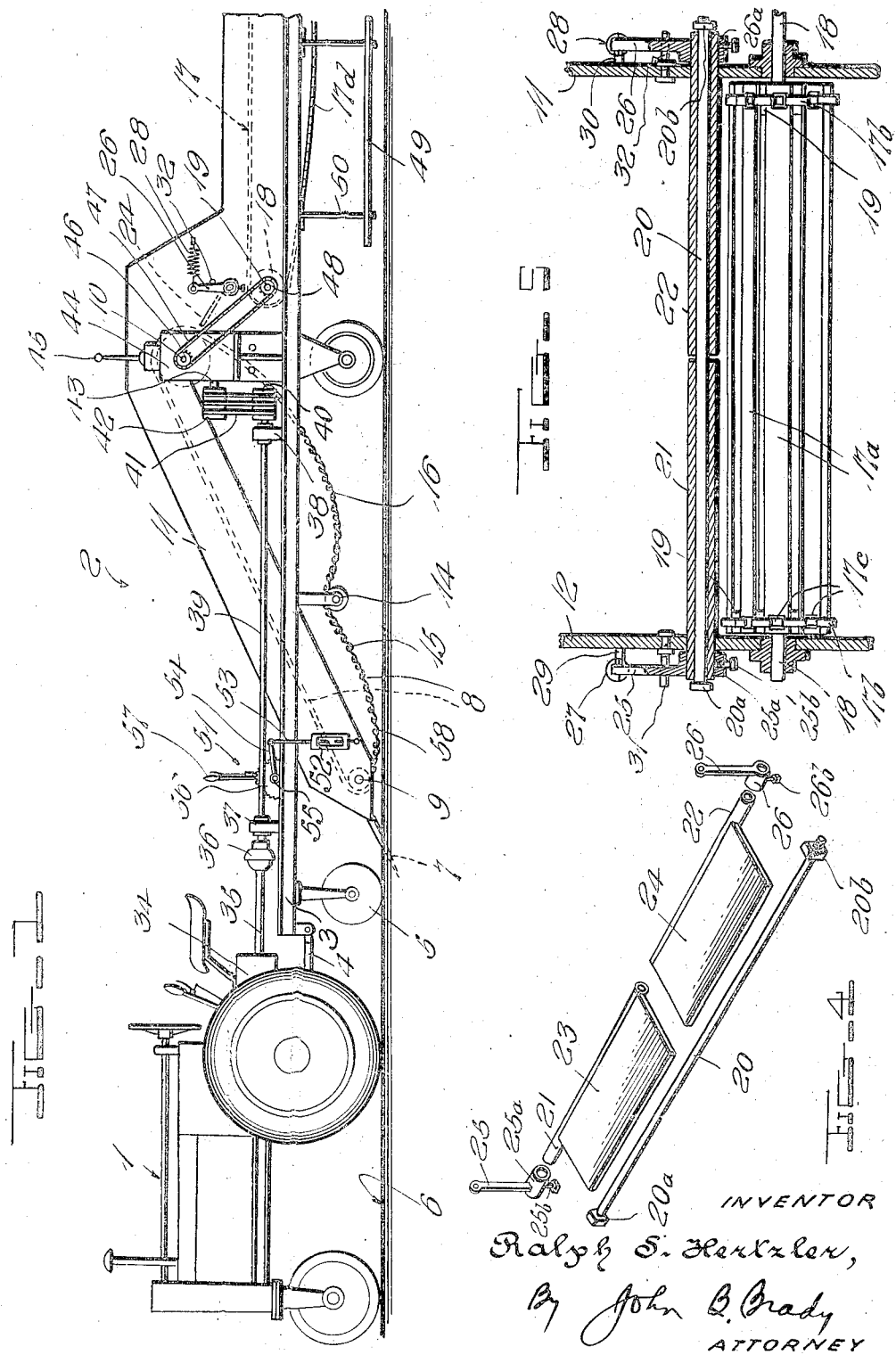

2,438,500

UNITED STATES PATENT OFFICE 2,438,500

CONVEYING MECHANISM FOR HARVESTING MACHINES

Ralph S. Hertzler, Elverson, Pa.

Application December 11, 1945, Serial No. 634,382

7 Claims. (Cl. 198—45)

My invention relates broadly to harvesting machines, and more particularly to an improved construction of machine for harvesting potatoes and other tuberous vegetables.

One of the objects of my invention is to provide an improved construction of harvester for potatoes and other tuberous vegetables including a chain-type elevator conveyor, and a picker table having a stone trap interposed between the elevator conveyor and the picker table.

Another object of my invention is to provide an arrangement of stone trap for harvesters having means for preventing obstructions such as stones which may be caught in the links of the elevating conveyor of the harvester from impairing the operation of the harvester.

Still another object of my invention is to provide an arrangement of yieldably arranged obstruction relief means interposed between an elevating conveyor and a picker table conveyor for a harvester for preventing impairment in the operation of the harvester from obstructions offered by stones and the like which may be caught in the elevating conveyor.

Other and further objects of my invention reside in a construction of stone trap for harvesters as set forth more fully in the specification hereinafter following by reference to the accompanying drawings, in which:

Figure 1 is a side elevational view of a harvester showing the application of the stone trap of my invention thereto; Fig. 2 is an enlarged cross-sectional view taken through the upper portion of the elevating conveyor and an adjacent portion of the picker table or selection conveyor and illustrating the stone trap of my invention interposed therebetween; Fig. 3 is a fragmentary plan view of the conveyor arrangement and stone trap illustrated in Fig. 2; Fig. 4 is a perspective view of the stone trap mechanism of my invention; and Fig. 5 is a vertical sectional view taken substantially on line 5—5 of Fig. 2 and illustrating the arrangement of sections of the stone trap intermediate the elevating conveyor and the picker table or selection conveyor of the harvester.

Referring to the drawings in detail, reference character 1 designates a tractor for pulling the harvesting machine represented at 2. The harvester may be horse drawn where tractors are not available. The harvesting machine includes a chassis 3 connected to the rear of the tractor 1 through draw bar 4. The chassis 3 is suitably supported at the forward end by a pressure roll 5 which flattens out the vines and vegetation as the harvester is drawn over the field 6 preparatory to the plowing of the tuberous vegetables from the field by the plow members 7. The plow members 7 are supported with respect to chassis 3 in a manner in which the plowing depth thereof may be precisely regulated for delivering the tubular vegetables, the associated vines, and stones and dirt to the elevating conveyor represented at 8. The plowing depth is positively controlled for accurate depth adjustment in relation to varied growing depths. An elevating conveyor 8 of the link chain type is supported with respect to the chassis 3 for movement over sprocket wheels carried by shaft members 9 and 10 transversely journaled between the side walls 11 and 12 carried by the chassis. The inclined elevator web is mounted immediately behind the plow. The length of the conveyor in relation to the extreme height and speed of the conveyor is basic to the design and performance of the harvester of my invention.

The shaft members 9 and 10 each carry sprocket wheels at spaced intervals thereof which engage the spaced links of the chain type elevating conveyor 8. The chain-type elevating conveyor 8 is employed in order to remove as much as possible of the dirt and clay normally adhering to the surface of the tuberous vegetables by sufficient agitation of the vegetables to permit the dirt and clay to drop through the conveyor. The underside of the elevating conveyor 8 is provided with slack in its return path of travel and is supported in an intermediate position by sprocket wheels carried by shaft 14, which is journaled in opposite sides of chassis 3. The chain-like elevating conveyor slacks on either side of the sprocket wheels carried by shaft 14, as shown at 15 and 16.

The elevating conveyor 8 has associated therewith the picker table or selection conveyor 17 also mounted for continuous movement with respect to the chassis 3 adjacent the end of the elevating conveyor 8 but appreciably below the delivery end of the elevating conveyor 8. The picker table or selection conveyor 17 consists of a multiplicity of transversely extending slats 17a spaced from each other and each apertured adjacent opposite ends for the passage of interconnecting links 17b which are looped through apertures 17c. Apertures 17c serve not only as passages for the interconnecting links 17b but also as passages through which the sprocket teeth of the sprocket wheels 18, which support the picker table or selection conveyor 17 from shaft members represented at 19, extend. The shaft members which support the picker table or selection conveyor 17 are journaled between the side walls 11 and 12 of the chassis and serve to support through the associated sprocket wheels the picker table or selection conveyor 17 in a position in which the upper surface of the picker table or selection conveyor 17 is substantially horizontal and in which the lower portion 17d thereof is allowed to slack as shown.

Immediately behind the upwardly inclined elevating conveyor 8, between this and the picking table conveyor 17, a stone trap is incorporated as shown more clearly in Figs. 2 and 3. This stone trap serves a triple purpose by serving as a guide to direct the tuberous vegetables from the inclined elevator web 8 on to the picking table 17, and at the same time preventing the vegetables from falling through a necessary clearance space between the elevator web 8 and picking table 17. Its third purpose is to prevent the mechanism from jamming or stopping by allowing stones, etc., that might become lodged between the links of the elevator web 8, to pass through the stone trap where they are freed by the reverse action of the links and fall to the ground. This is accomplished by virtue of the yieldability of the stone trap when pressure is applied by the lodged stone. The pressure angularly shifts the blade or surface of the stone trap, allowing the lodged stone to pass through instantly. And by means of a spring arrangement the blade or surface instantly returns to its original position thereby eliminating any appreciable loss of vegetables through the opening. The blade or surface of the stone trap is comprised of one or more independent sections, so that only the surface immediately adjacent to the lodged stone is opened to allow passage of the stone. The transverse supporting rod 20 extends substantially normal to the planes of the side walls 11 and 12 of the chassis 3 and is provided with a confining head 20a on one end thereof and is screw-threaded on the opposite end thereof to receive the nut 20b. The rod member 20 serves as a supporting and journaling means for the tubular members 21 and 22 to which are connected the flat members 23 and 24, respectively. The flat members 23 and 24 constitute chutes for directing the vegetable, vines, and such clods of dirt which may still remain by the time that the elevating conveyor 8 reaches the discharge position with respect to the picker table or selection conveyor 17. The flat members 23 and 24 terminate short of the tuular members 21 and 22, enabling the tubular members 21 and 22 to project beyond the side walls 11 and 12 for receiving thereon the adjustable arms 25 and 26, respectively. The arms 25 and 26 are integral with the sleeve members 25a and 26a which engage over the projecting ends of tubular members 21 and 22, respectively.

Set screws 25b and 26b, which pass through sleeves 25a and 26a, respectively, are clamped against tubular members 21 and 22 for selectively setting the arms in pre-determined angular positions with respect to the planes of the flat members 23 and 24, respectively. The arms 25 and 26 are engaged at their ends by means of coil spring members 27 and 28, respectively, which are attached at their opposite ends to eyelet members 29 and 30 fastened to the walls 12 and 11 of the chassis. A pair of limiting stops 31 and 32 are secured through the side walls 11 and 12 of the chassis and serve as abutment means for arms 26 and 25, respectively, for limiting the normal position to which coil springs 28 and 27 are arranged to yieldably maintain flat members 23 and 24 as shown more particularly in Fig. 2. Thus the flat members 23 and 24 are maintained in upward position serving as chutes between the elevating conveyor 8 and the picker table or selection conveyor 17 while free to be angularly depressed to the dotted line position represented in Fig. 2 for releasing an obstruction which may be caught between the links of the elevating chain conveyor 8.

The links of the elevating chain conveyor 8, while permitting the discharge of excess dirt and small stones, as the vegetables and vines are elevated, often catch stones, such as represented at 33 in Fig. 2. These obstructions, as represented by the projecting stone 33, if permitted to strike the picker table or selection conveyor 17, might jam the machine or block the operation. The object of the stone trap, constituted by the yieldably supported flat members 23 and 24, is to prevent the blocking or jamming of the machine by obstructions offered by large stones. The stone trap is sufficient to fill the space necessary, from a practical standpoint, between the head driving sprockets of the elevating chain conveyor 8 and the driving cross shaft 19 spaced from the picker table conveyor 17. The linked type of elevating conveyor, while serving to agitate and roll over the vegetables as the elevating action continues for positively shaking off dirt, inherently involves the possible catching of stones between the links. These stones, in the course of movement of the conveyor, might occasion stoppage of the machine without the interposition of the stone trap. However, the stone trap, and particularly the sections thereof, by virtue of the yieldability thereof, may be angularly shifted to a sufficient degree to permit passage of the projecting stones 33 caught between the links of the elevating conveyor 8 by momentary displacement of the stone trap. The stone trap promptly returns to its normal position as soon as the obstruction passes, and continues to serve as a guide or chute for directing the vegetables to the picker table or selection conveyor 17.

The drive for the elevating conveyor 8, and picker table or selection conveyor 17 is taken from the tractor 1 through the connection illustrated at 34. A drive shaft 35 extending from the tractor in a substantially horizontal plane and displaced at an angle for establishing coupling relationship with the coupling member 36 delivers power to the mechanism supported by chassis 3 adjacent one side of the chassis. The chassis 3 is provided with suitable transmission shaft supporting means at 37 and 38 adjacent one side of the chassis in which transmission shaft 39 is journaled. The transmission shaft 39 imparts rotary motion to the drive pulley 40 which is provided with a grooved driving surface engaging in a multiplicity of spaced belts 41 which engage the surface of the driven pulley 42 connected through shaft 43 to the transmission gear system represented as enclosed by transmission casing 44. The transmission within transmission casing 44 is controlled by means of a gear shift lever 45 for selecting the speeds at which the elevating conveyor 8, and picker table or selection conveyor 17 are driven. The shaft member 10 extending from the transmission gear box 44 carries sprocket wheel 46 thereon which drives chain 47 for rotatively driving sprocket wheel 48 carried by shaft 19 of the picker table or selection conveyor 17. The fact that belts 41 are interposed between the transmission drive shaft 39 and the drive for the transmission gears in gear box 44 insures sufficient slippage to prevent injury to the equipment in the event of development of substantial obstruction in the movement of the parts of the transmission system until the obstruction has been removed.

The operatives may conveniently stand on platforms 49 suspended on either side of the chassis 3 through depending members 50. The height of the platforms 49 is such that the operatives may conveniently reach all parts of the picker table or selection conveyor 17 in picking up and removing the potatoes therefrom.

The depth at which the plow member 7 may operate is precisely controlled through an adjustment means which I have represented at 51 as including a turn-buckle screw device 52 and associated link 53 at either side of the chassis 3 exterior to the walls 11 and 12 and connected with lever arms represented at 54 extending from a shaft 55. The shaft 55 is controlled through a segmental gear 56 and lever 57 carrying a pawl engageable therewith. The adjustment means 51 thus controls the angular position of the plow members 7.

The underside of the elevating conveyor 8, which is slacked at 15, serves as a ground surface-engaging means at the lowest point of its catenary 58. The catenary portion 58 of the conveyor thus serves as a rake or harrowing means actually filling the furrows beyond the plowed portion thereof.

The transmission from the tractor to the harvester in the structure of the present invention does not form a part of this particular application but is set forth in detail in a co-pending application. Accordingly, I have illustrated the transmission mechanism very generally herein as the subject matter of the instant invention is directed more particularly to the stone trap, which has been claimed hereinafter.

The harvester of my invention is particularly intended for the harvesting of potatoes but the principles and structures of the harvester of my invention are applicable to the harvesting of any tuberous vegetable, such as, carrots, turnips, beets, or other tuberous vegetable, and I do not intend that my invention be limited in any sense to potato harvesters.

I have found the construction of harvester as set forth herein highly practical in manufacture and production and operation. I realize, however, that changes and modifications may be made and I desire that it be understood that I intend no limitation upon my invention other than may be imposed by the scope of the appended claims.

What I claim as new and desire to secure by Letters Patent of the United States is as follows:

1. In a harvesting machine, an elevating chain-like conveyor, a picker table conveyor adjacent the end of said elevating chain-like conveyor and a pair of coplanar yieldably supported chutes interposed between said elevating conveyor and said picker table conveyor for normally directing delivery of material from said chain-like elevating conveyor to said picker table conveyor and each displaceable under pressure from obstructions caught in said elevating chain-like conveyor.

2. In a harvesting machine, an elevating chain-like conveyor, a picker table conveyor adjacent the end of said elevating chain-like conveyor, and a plurality of coplanar pivotally mounted chutes interposed between said elevating conveyor and the picker table conveyor for normally directing delivery of material from said chain-like elevating conveyor to said picker table conveyor and each displaceable under pressure from obstructions caught and carried by said chain-like conveyor, and spring means for restoring each of said chutes from a yieldably displaced position to a delivery position.

3. In a harvesting machine, an elevating chain-like conveyor, a picker table conveyor adjacent the end of said elevating chain-like conveyor, and a plurality of coplanar pivotally mounted chutes interposed between said elevating conveyor and the picker table conveyor for normally directing delivery of material from said chain-like elevating conveyor to said picker table conveyor and each displaceable under pressure from obstructions caught and carried by said chain-like conveyor, a lever arm connected with each of said pivotally mounted chutes, separate spring means for continuously subjecting each of said lever arms to tension for normally maintaining said chutes in a coplanar position for directing material from said chain-like conveyor to said picker table conveyor, said chutes and lever arms being angularly displaceable under pressure developed by the movement of obstructions caught in and carried by said chain-like conveyor, and said chutes being returnable to normal delivery position under control of the spring tensioned lever arms.

4. In a harvesting machine, an elevating chain-like conveyor, a picker table conveyor disposed in a position appreciably below the delivery end of said elevating chain-like conveyor and spaced therefrom a greater distance than the average size of the material to be transferred from the elevating chain-like conveyor to the picker table conveyor, a plurality of coplanar angularly displaceable chutes interposed between the upper end of said elevating chain-like conveyor and said picker table conveyor and normally closing the gap therebetween, spring means for maintaining each of said pivotally mounted chutes in a position for normally transferring material from said elevating chain-like conveyor to said picker table conveyor, said chutes being displaceable by abutment with obstructions caught in said elevating chain-like conveyor permitting the passage of such obstructions, said chutes being restorable to normal position by said spring means subsequent to the passage of such obstructions caught in and carried by said chain-like conveyor.

5. In a harvesting machine, an elevating chain-like conveyor, a picker table conveyor disposed in a position appreciably below the delivery end of said elevating chain-like conveyor and spaced therefrom a greater distance than the average size of the material to be transferred from the elevating chain-like conveyor to the picker table conveyor, a transversely extending bar disposed immediately over said picker table conveyor, a plurality of coplanar chutes pivoted along one horizontal edge on said bar and extending in an angularly disposed plane toward the upper end of said elevating chain-like conveyor, a lever arm associated with each of said chutes, spring means for normally maintaining each of said lever arms under tension for retaining said chutes in a position for directing delivery of material from said elevator conveyor to said picker table conveyor, said chutes being displaceable under pressure of obstructions caught in and carried by said elevating chain-like conveyor for permitting the passage of such obstructions between said elevating chain-like conveyor and said picker table conveyor and said spring means operating to restore said chutes to delivery position.

6. In a harvesting machine, an elevating chain-like conveyor, a picker table conveyor disposed in a position appreciably below the delivery end of said elevating chain-like conveyor and spaced therefrom a greater distance than the average size of the material to be transferred from the elevating chain-like conveyor to the picker table conveyor, a bar member extending transversely with respect to said conveyors and spaced immediately above said picker table conveyor, and a multiplicity of chute sections having edge portions pivotally mounted with respect to said bar member and projecting to a position adjacent the delivery end of said elevating chain-like conveyor, spring means individual to each of said sections for allowing independent displacement of said sections under conditions of abutment of obstructions caught in and carried by said elevating chain-like conveyor, said sections each being restorable under normal conditions under the action of said spring means.

7. In a harvesting machine, an elevating chain-like conveyor, a picker table conveyor disposed in a position appreciably below the delivery end of said elevating chain-like conveyor and spaced therefrom a greater distance than the average size of the material to be transferred from the elevating chain-like conveyor to the picker table conveyor, a transversely extending bar spaced from said picker table conveyor in a position adjacent the end thereof, and a pair of independently movable chutes pivotally mounted on said bar and normally extending in an inclined plane toward the delivery end of said elevating chain-like conveyor for normally directing material from said elevating chain-like conveyor to said picker table conveyor, spring means for normally maintaining each of said chutes in delivery positions, said chutes being independently displaceable under conditions of abutment with obstructions caught in and carried by said elevating chain-like conveyor for permitting the free movement of said elevating chain-like conveyor, said spring means operating to restore each of said chutes to normal delivery position after the passage of the aforesaid obstruction.

RALPH S. HERTZLER.

REFERENCES CITED

The following references are of record in the file of this patent:

UNITED STATES PATENTS

| Number | Name | Date |
|---|---|---|
| 740,947 | Taylor et al. | Oct. 6, 1903 |
| 1,580,683 | Sang | Apr. 13, 1926 |
| 2,285,321 | Zadenach | June 2, 1942 |
| 2,398,821 | Davidson | Apr. 23, 1946 |